Sept. 18, 1956 A. K. FREDERICK 2,763,441
TOROIDAL COIL WINDER

Filed March 30, 1953 6 Sheets-Sheet 1

ALTON KARL FREDERICK,
INVENTOR.

HUEBNER, BEEHLER,
WORREL & HERZIG,
ATTORNEYS.

BY Albert M Herzig

Sept. 18, 1956
A. K. FREDERICK
2,763,441
TOROIDAL COIL WINDER
Filed March 30, 1953
6 Sheets-Sheet 2
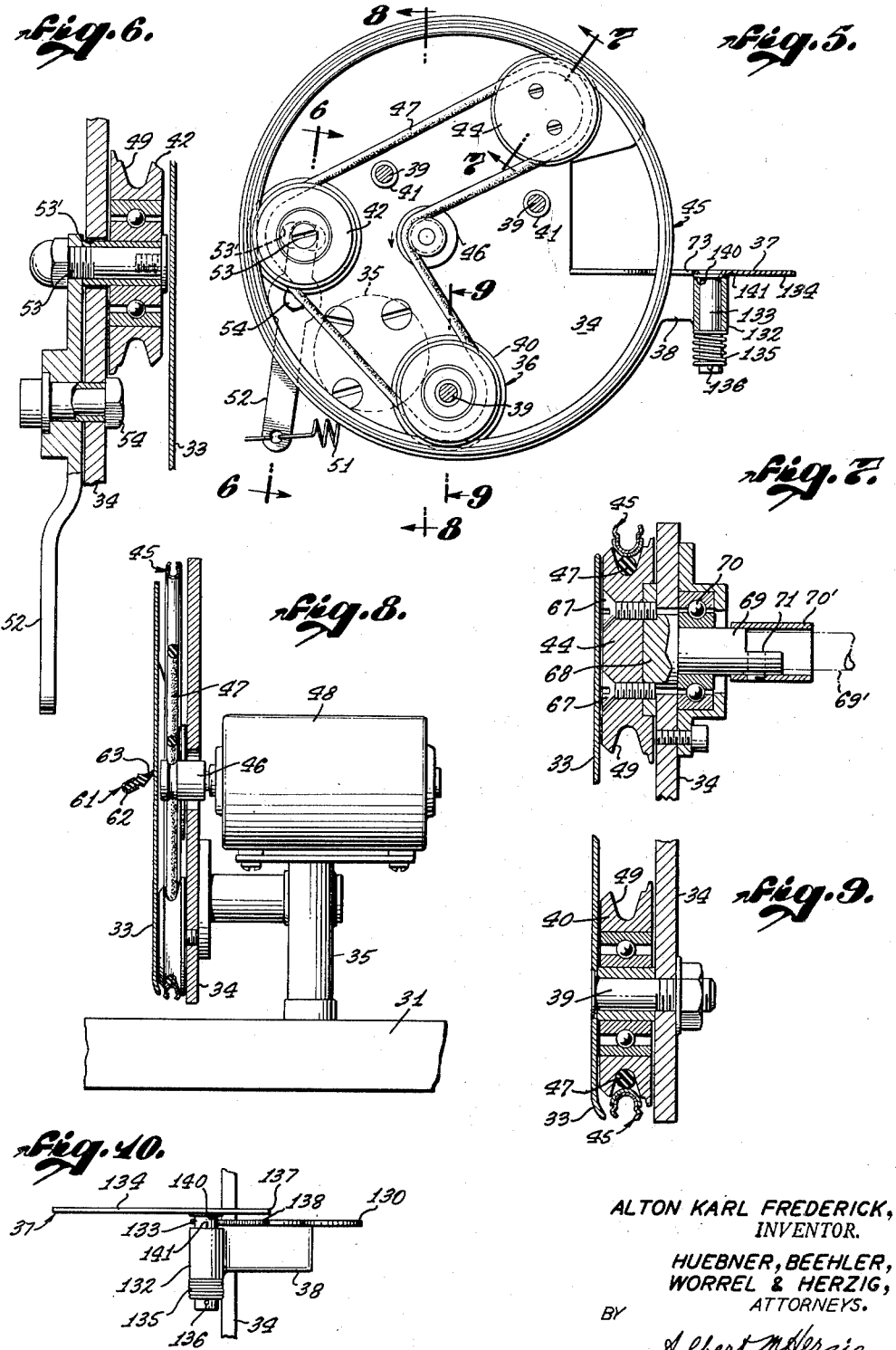
ALTON KARL FREDERICK,
INVENTOR.
HUEBNER, BEEHLER,
WORREL & HERZIG,
ATTORNEYS.
BY Albert M. Herzig Sept. 18, 1956  A. K. FREDERICK  2,763,441
TOROIDAL COIL WINDER
Filed March 30, 1953  6 Sheets—Sheet 3
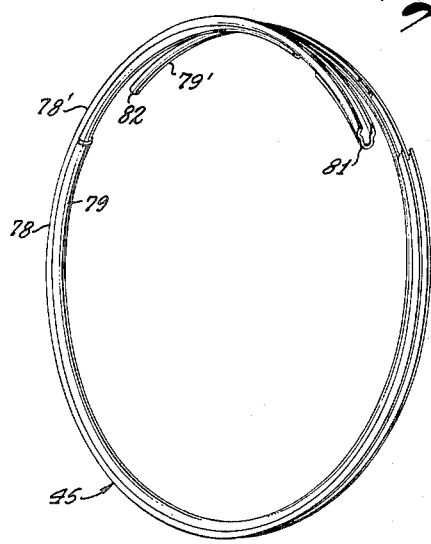
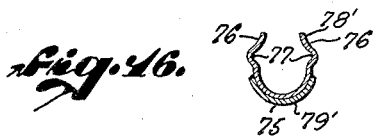
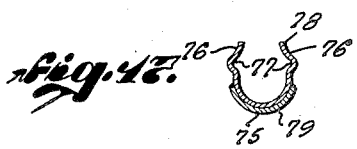
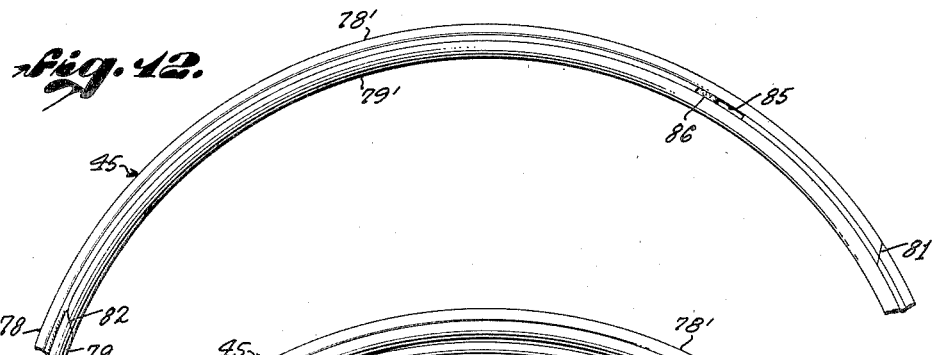
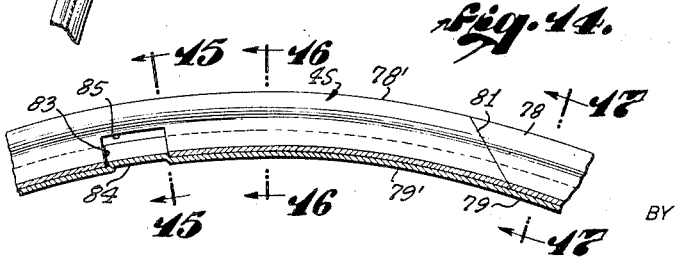
ALTON KARL FREDERICK,
INVENTOR.
HUEBNER, BEEHLER,
WORREL & HERZIG,
ATTORNEYS.
BY Albert M Herzig

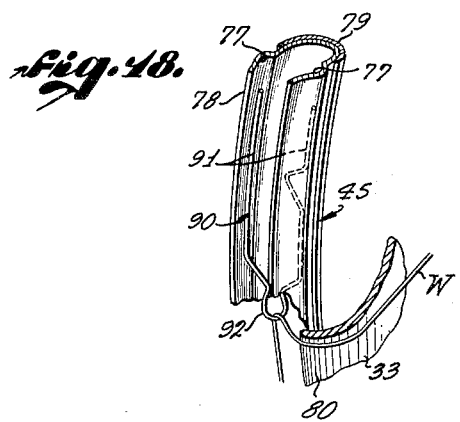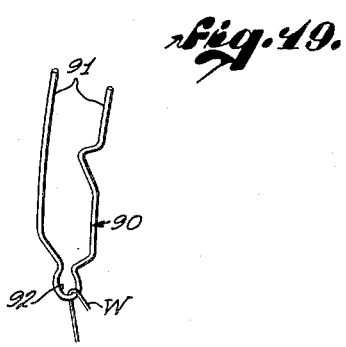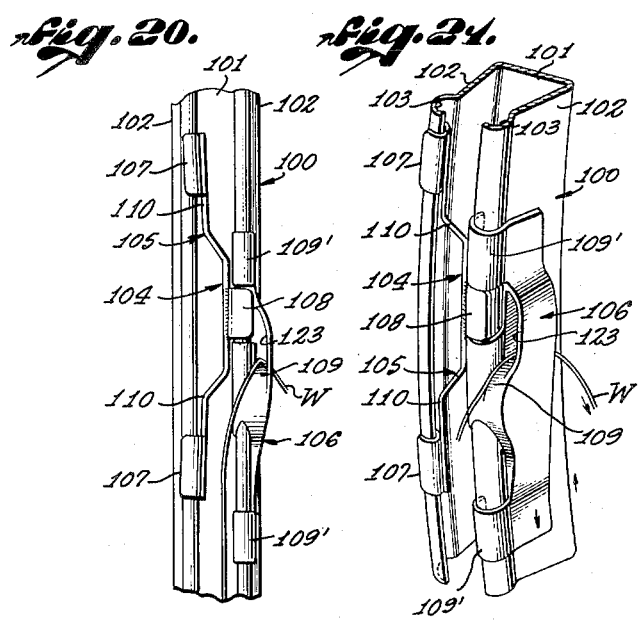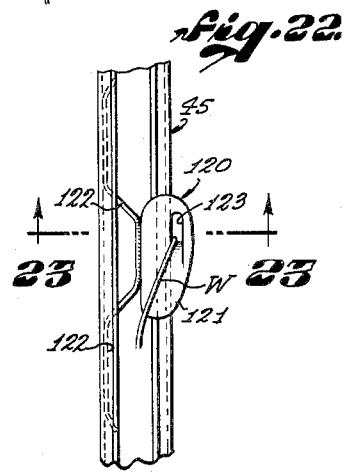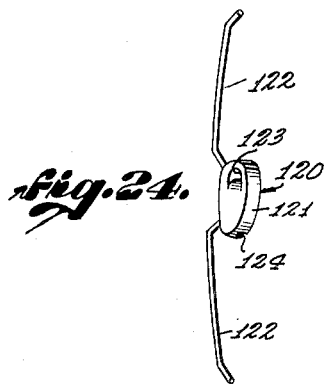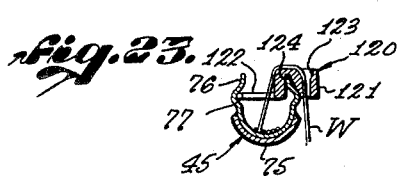

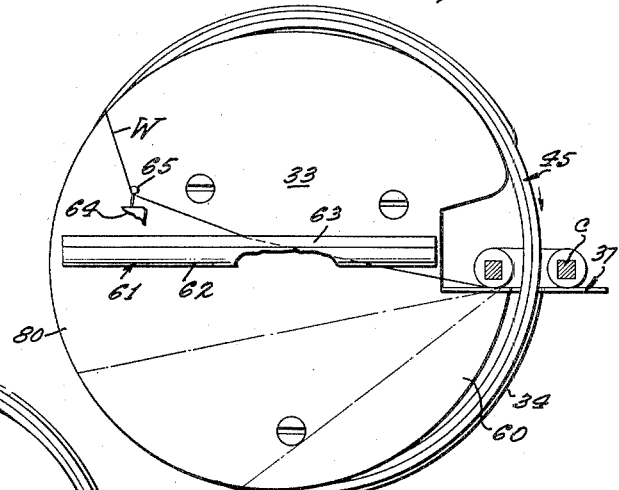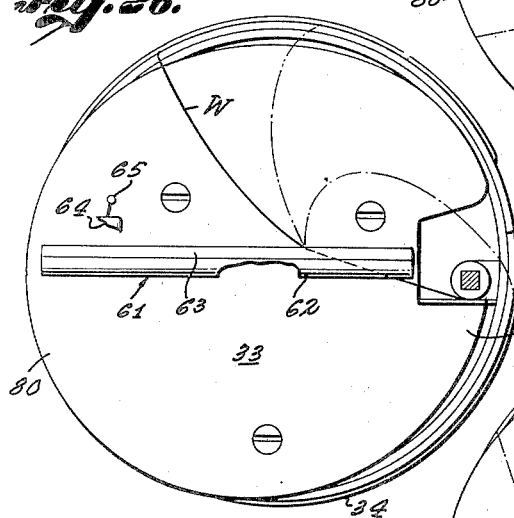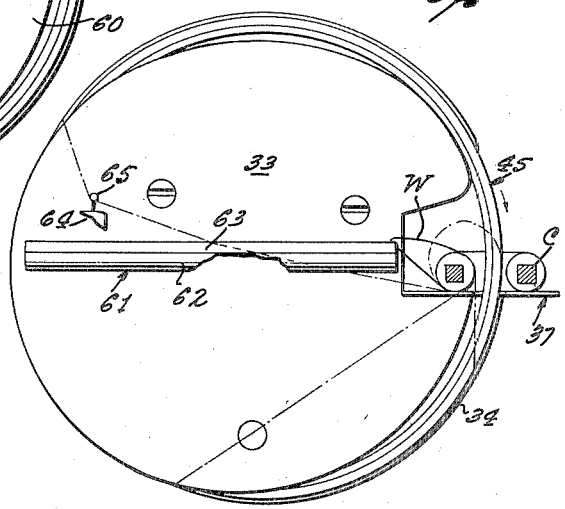

Sept. 18, 1956     A. K. FREDERICK     2,763,441
TOROIDAL COIL WINDER
Filed March 30, 1953     6 Sheets-Sheet 6
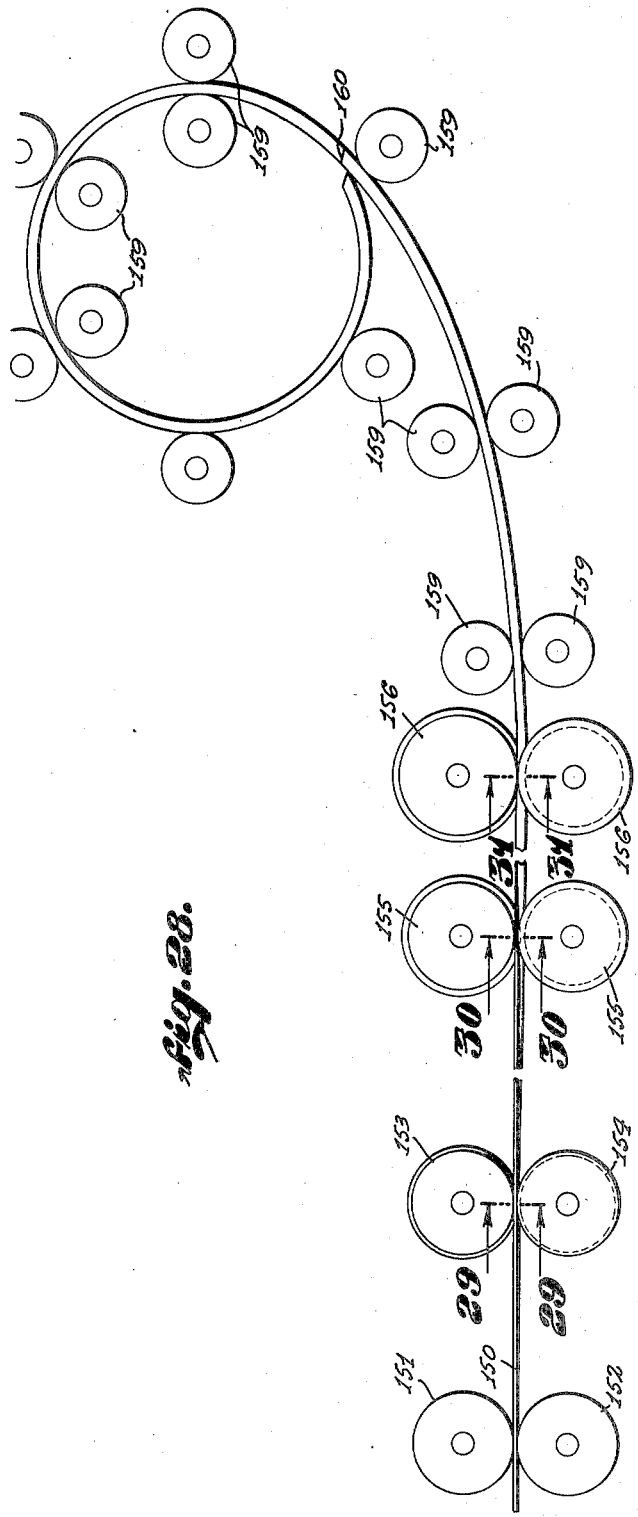
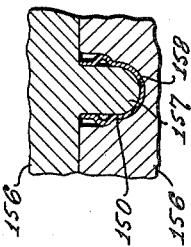
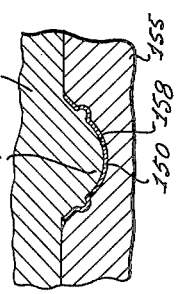
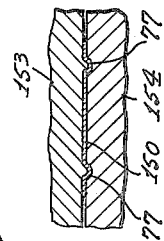
ALTON KARL FREDERICK,
INVENTOR.
HUEBNER, BEEHLER,
WORREL & HERZIG,
ATTORNEYS.
BY

United States Patent Office 2,763,441
Patented Sept. 18, 1956

2,763,441
TOROIDAL COIL WINDER
Alton K. Frederick, Los Angeles, Calif.
Application March 30, 1953, Serial No. 345,488
1 Claim. (Cl. 242—4)

This invention relates to improvements in toroidal coil winding apparatus.

It is among the objects of this invention to provide in a toroidal coil winding apparatus of new and improved construction, new and improved bobbin-driving means, new and improved bobbin winding and unwinding means, new and improved take-off means for the wire wound upon the bobbin, new and improved adjustable tensioning means adapted for the releasable selective tensioned unwinding under breaking tension of the bobbin-wound wire, new and improved releasable and adjustable frictional engaging means for the wire between the last mentioned breaking tension means and a coil and core being wound, and new and improved automatically self-adjusting core and coil supporting means, all of new and improved interrelated structure and operation.

It is also among the objects of the invention to provide in a new and improved toroidal coil winder of the desired character described, a new and improved bobbin construction and method for making the same.

The invention also has among its objects the provision of a toroidal coil winding apparatus by means of which, in a simple and effective, economical manner, very fine wire and very small coils, and optionally, heavy wire and large diameter coils, can be wound with a selective degree of tautness at any phase of the winding operation, so that, for example, particularly in coils having square cores, tautness in the wire can be achieved without danger of breakage or excessive abrasion of the wire, and the degree of tautness of the wire being wound upon the coil and hence the tautness with which the wire is wound upon the core itself, can be decreased at any preselected point in the winding operation.

It is a further object of the invention to provide such an apparatus in which the winding wire and its insulation are subjected to the least abrasive contact or action in the winding of a coil therewith.

Another further object of the invention is the provision of new and improved means for selectively adjusting tension of a subject wire.

This invention also contemplates among its objectives the provision of improvements over prior art devices hereinbefore intended to accomplish generally similar purposes.

With these and other objects in view, the invention consists of the construction, arrangement and combination of the various parts of the device whereby the objects contemplated are attained, as hereinafter set forth, pointed out in the appended claim, and illustrated in the accompanying drawings.

In the drawings:

Figure 5 is a sectional view taken on line 5—5 of Figure 2 showing the driving arrangement.

Figure 6 is a vertical sectional view taken on line 6—6 of Figure 5.

Figure 7 is a fragmentary vertical sectional view taken on line 7—7 of Figure 5.

Figure 8 is a vertical sectional view taken on line 8—8 of Figure 5.

Figure 9 is a fragmentary vertical sectional view taken on line 9—9 of Figure 5.

Figure 10 is a fragmentary detail view taken as from the right-hand side of Figure 5.

Figure 11 is a perspective view of the bobbin showing the bobbin in the open position.

Figure 12 is an enlarged fragmentary side view in elevation of the bobbin in the closed position.

Figure 13 is a view similar to Figure 11, showing the bobbin in the open position.

Figure 14 is an enlarged fragmentary vertical sectional view as seen through the center of the bobbin in the plane thereof.

Figure 15 is a vertical sectional view taken on line 15—15 of Figure 14.

Figure 16 is a vertical sectional view taken on line 16—16 of Figure 14.

Figure 17 is a vertical sectional view taken on line 17—17 of Figure 14.

Figure 18 is a fragmentary perspective view of the bobbin showing one form of slider usable in the instant purpose.

Figure 19 is a perspective view of the slider seen in Figure 18.

Figure 20 is an end view in elevation of a preferred form of bobbin and slider embodying this invention.

Figure 21 is a perspective view of the bobbin and slider shown in Figure 20.

Figure 22 is an end view of another preferred form of bobbin and slider embodying this invention.

Figure 23 is a sectional view taken on line 23—23 of Figure 22.

Figure 24 is a perspective view of the slider seen in Figures 22 and 23.

Figure 25 is a side view of the bobbin mechanism in a selected stage of winding.

Figure 26 is a similar view thereof in a further stage of winding of the coil.

Figure 27 is another similar view thereof, in a still further stage of winding.

Figure 28 is a schematic view of an apparatus illustrating a preferred method of forming a bobbin of the instant construction.

Figure 29 is a fragmentary detail sectional view taken as on a line 29—29 of Figure 28.

Figure 30 is a fragmentary detail sectional view taken as on a line 30—30 of Figure 28.

Figure 31 is a fragmentary detail sectional view taken as on a line 31—31 of Figure 28.

Figure 1:
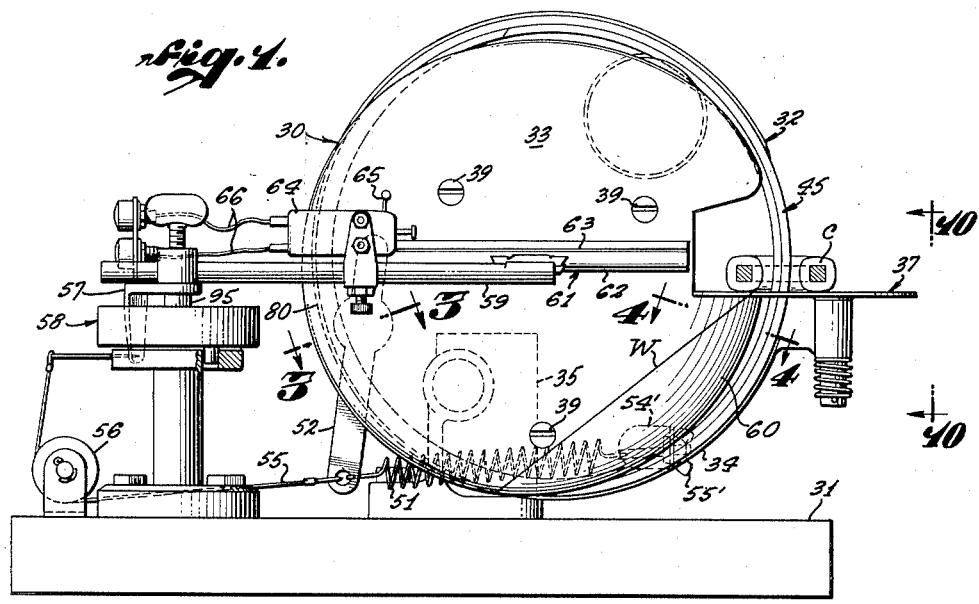
Figure 1 is a side view in elevation of my invention.

Referring more in detail to the drawings, for the purpose of illustration but not of limitation, a toroidal coil winding apparatus 30, according to my invention, comprises a base plate 31, and a winding frame generally designated at 32.

The winding frame is formed of a pair of circular plates 33 and 34 rigidly mounted on the base plate 31 as by a bracket 35. The plate 34 preferably serves as a mounting plate for the bobbin supporting mechanism which is generally designated at 36, and for a toroidal coil support platform 37, and is secured to the bracket 38. The outer plate 33 is attached to the mounting plate 34 by screws 39, one of which can also serve as a shaft for one of the support pulleys 40.

The plates 33 and 34, held in spaced relationship as by spacers 41, contain therebetween the bobbin and bobbin supporting mechanism. Plate 33 is of such diameter as to cover the bobbin supoprting mechanism 36, but to cover only a portion of the annular bobbin 45, that portion being substantially diametrically opposite from the coil being wound.

A cutout is provided in the region of the coil support platform in both plates 33 and 34, to accommodate the core and coil being wound.

The bobbin support mechanism interposed between the plates 33 and 34 consists of idler pulleys 42 and 44, and the pulley 40. Interconnecting the pulleys with a drive pulley at 46 is an endless belt 47. The pulley 46 is driven by a motor 48, which is also mounted on the bracket 35.

The grooves 49 of the pulleys 40, 42 and 44 are shaped to frictionally engage the belt 47, and are wide enough at their outer periphery to accommodate the bobbin 45. The belt is preferably round in cross section, and engages the inner periphery of the bobbin at said pulleys 40, 42 and 44, to support and frictionally drive the bobbin 45.

To keep said pulley belt in desired frictional driving engagement with the bobbin, the pulley 42 is normally urged outwardly towards the bobbin, as by means of a tension spring 51. for such purpose said pulley 42 is mounted on one end of a lever 52 by means of a stub shaft 53 which extends through a slot 53' in the plate 34. The lever 52 is pivoted as on a pin 54 mounted in the plate 34, and has attached at its lower end any suitable spring 51, one end of which is mounted for adjustable tensioning at a bracket 54' through a wing nut and bolt adjustment 55'. The spring 51 urges the lever 52 about its pivot 54 so as to bias the pulley against the inner surface of the bobbin.

By releasing the tension of the spring 51, as through the wing nut 55, the pulley 42 can be disengaged from the bobbin, so that the latter can be removed from the aligned grooves of the pulley support.

Attached as to the same lower end of the lever 52 as the spring, but extending in the opposite direction, is a slack cable which passes around an idler pulley 56 and is attached to the arm 57 of a wound spring mechanism 58. The spring (not shown) of the mechanism 58 normally urges a wiper arm 59 to bear a resilient surfaced wiper 61 on the plate 33 with a selected tension.

The wiper 61 may consist of an elongated metallic clip 62 which holds a rubber or similar resilient member 63 held in contact with the plate 33.

Said arm 59 also supports an electrical cartridge 64 adjusted so as to keep a yieldably held finger 65 including a ball point in contact with the plate 33. Said cartridge comprises a phonograph pick-up head and is so constructed as to send an electrical impulse when the spring finger 65 is displaced from the face of the plate 33, said impulse being thus utilized to record the number of turns of wires wrapped on the toroidal coil by way of wires 66 leading to a recording instrument of conventional type, such as an electrical counter, each time a loop is added to a coil being wound.

The pulley 44 is also preferably mounted in a manner to operatively engage another form of counting mechanism 72, to which it is attached as by screws 67 threaded into an enlarged head portion 68 of a shaft 69. Said shaft 69 extends rearwardly through the back plate 34, where it is rotatably supported, as in a bearing 70 mounted thereon, and terminates rearwardly in a coupling 70', in which it is kerfed, as at 71, for driving engagement with the shaft 69', of the counter 72. Such counter 72 is used for measuring a desired amount of wire W being wound, e. g., located on the bobbin, and may thereafter be disconnected.

The coil support platform 37 is rigidly secured to the plate 34 and is slotted at 73 to allow insertion of and accommodate the bobbin 45 during use. Said slot 73 is somewhat arcuate and lies along the outer surface of the outer plate 33, with its inner end 73' intersecting the bobbin in the annular path of the latter.

Said bobbin 45 is annular in form and substantially U-shaped in cross section, having an inner wall 75 and side walls 76. The side walls are preferably but not necessarily formed with opposed circumferential grooves or tracks 77. An arcuate section of the bobbin is disengageable from the remaining body of the bobbin to facilitate its insertion into the annular core C to be wound.

To this end a pair of complementary annular rings 78 and 79 are employed. The ring 78 is U-shaped, as described, and forms the inner ring. The ring 79 is considerably shallower than the ring 78 and arcuate in cross section, and is adapted to accommodate the inner ring. Said two rings are joined in nesting relationship, as by soldering or the like, except for said arcuate section at which the rings may be sprung apart so as to open the annulus. At circumferentially spaced positions, the rings are diagonally cut respectively as at 81 in the ring 78, and 82 in the ring 79. Arcuate segments of separation 78' and 79' are thus formed.

A cutout 83 is also preferably formed in the segment 78', and a complementary raised portion or finger 84 is provided in the segment 79'. The bobbin can thereby be securely locked in a closed condition when the segments 78' and 79' are properly nested to close the gaps 78" and 79", resulting from said opening of the annulus 45, and snap the raised portion 84 into the cutout 83.

The cutout 83 is slightly larger transversely than the ring 79, so as to leave an aperture 85 in the body of the annulus when the bobbin is closed. One end of the coil-winding wire W is secured through this aperture as by a small piece of plastic adhesive material 86 on the outer edge of the bobbin.

Slidably disposed in the grooves 77, with preselected tension, is a slider 90. The slider serves to keep the proper tension on the wire W being wound and to pay out said wire only as needed. The slider 90 is, for this purpose, formed of a resilient material such as springy wire, with a pair of legs 91 engaging the opposed grooves 77. The eye portion 92 of the slider 90 is threaded with the wire W. The slider 90 is disposed in grooves 77 with the eye 92 pointing in the direction of rotation of the bobbin while wire is being wound on the core C.

In the use of the above described invention, initially to unlock and open the bobbin, the rings 78 and 79 are separated at the cutout 83 to disengage the raised portion 84, allowing the arcuate sections 78' and 79' to spring and slip apart. This forms a spiral ring which can be readily inserted through the core C of a proposed toroidal coil.

The bobbin is then locked closed with the raised portion 84 in the cutout 85. With the core threaded by the now annular bobbin, the bobbin is placed on the pulleys. The spreading tension of the pulley 42 is relieved by rotating the arm 59 clockwise about its spring-urged pivot 95 of the mechanism 58, which also rotates arm 57. The cable 55 attached to the arm 57 is pulled taut and pivots the lever 52 against the tension of spring 51. The rotating of lever 52 pulls the pulley inwardly to permit installation of the bobbin. The bobbin 45 is then slipped over the plate 33 and onto the pulleys 40, 42 and 44.

The arm 59 is then returned so the wiper bears against the plate 33, allowing the spring 51 to urge the pulley 42 to tighten against the bobbin.

One end of the wire W is inserted into the aperture 85 of the bobbin and secured in the adhesive 86. The counter 72 is installed on the shaft 69, and the motor 48 is energized to drive the pulleys and the bobbin in a counterclockwise direction, as shown in Figure 5, for example, so that the wire W is drawn into the bobbin 45 to load it. When the proper amount of wire has been loaded, as can be determined by the revolution counter 72, the motor is stopped and the wire cut.

The now free end of the cut wire is threaded through a slider 90, which is now installed with the legs slidably engaging the grooves 77 of the bobbin. The free end is then secured, and then preferably initially, wound a number of turns on the core. The motor 48 is then energized in a reverse direction so as to drive the bobbin in a clockwise direction, e. g., as shown in said Figures 5, or 24–26.

The wire W is drawn through the core by the bobbin, and as the bobbin continues to rotate, the wire is drawn off the bobbin at the enlarged portion of the plate 33, the slider yielding slidably when wire is required to be payed off. As the bobbin progresses in its cycle, the wire is drawn along the face of the plate 33 and under the resilient strip 63. This strip being spring-loaded, retains the wire, as seen in Figures 25, 26 and 27, until the wire has reached the end of the strip, when it forms a loose loop which is applied to the core C. This loop is drawn up to the proper tension as the bobbin progresses (e. g., Figure 27) to begin another cycle.

The core C rests on the platform 37, spanning the end of the slot 73, and needs only to be slightly guided as the action of this apparatus tends to rotate the coil and distribute the coils uniformly about the core. As the wire W is lifted under the finger, as seen in Figure 25, an impulse is recorded on the counter previously mentioned, and an accurate count of the coils applied to the core is controlled.

The left portion of the plate 33 that extends beyond the periphery of the bobbin 45 is preferably smoothly rounded to reduce strain on the wire, as shown most clearly in Figure 18.

A most desired satisfactory tension is kept on the wire W as it is being wrapped, by using a lighter gauge spring slider, of the type of Figure 19, for the finer wires used, and increasing the gauge proportionately with the gauge of wire being wrapped. In the use of such heavier wires, the form of slider most useful is shown in Figures 20 and 21.

In said figures, a bobbin 100 has an inner wall 101 and side walls 102. The side walls are formed as with grooves 103. A friction member 104 is preferably formed of two parts comprising a spring portion 105 and a body portion 108. The spring portion 105 spans the open edge of the bobbin and engages respectively the groove of one side wall of the bobbin channel by means of suitable glides at each of its free ends 107, and the edge of the opposed side wall of the bobbin at its intermediate glide portion 108.

A guide member 106 is adapted to engage with selected parts of the slider 104, and includes a rounded guide chute 109 for the wire W, and a pair of spaced clips 109' for mounting the friction member in a slidable relationship to the side wall of the bobbin so that a portion, e. g., the intermediate portion 106 of the friction member 104 is in contact therewith.

Said friction member 104 slips around the bobbin against the tension of spring arms 110, so as to interengage and retain the guide member.

As the wire W is payed off through the chute 109, the movement of the guide 106 is thus frictionally retarded to any desired extent and with any desired tension, depending upon the gauge and resilient characteristics of the spring portion 105, and also depending upon the number of such interlockable friction members 104 employed.

Another form of combined guide and friction member 120 is shown in Figures 22 and 23 and 24, comprising a guide body 121 and spring arms 122. The body 121 is formed with a guide chute or eyelet 123 and a lateral groove 124 for engagement with one complementary edge 76 of the bobbin 45. The spring arms 122 again slidably engage the grooves as at 77 of the bobbin and apply restraining tension.

It will be apparent that a smoothly rounded cover plate assures smooth operation under high speed winding. The portion of the plate underneath the coil supporting platform is broadly rounded as at 60, to lift the wire back up on the surface of the plate 33. Also at the enlarged portion of the plate opposite the coil platform, the plate is rounded as at 80 to smoothly lift the wire out of the bobbin.

The platform 37, in its preferred embodiment, comprises a stationary part 130 secured as to the member 34 by means of a bracket 38. Said bracket carries an integral sleeve 132, through which a vertical pin 133, carrying a complementary movable part 134, of the platform 37, is adapted to slide, being normally urged downwardly by means of a coil spring 135 secured on the pin 133, as by key 136.

Figure 2:
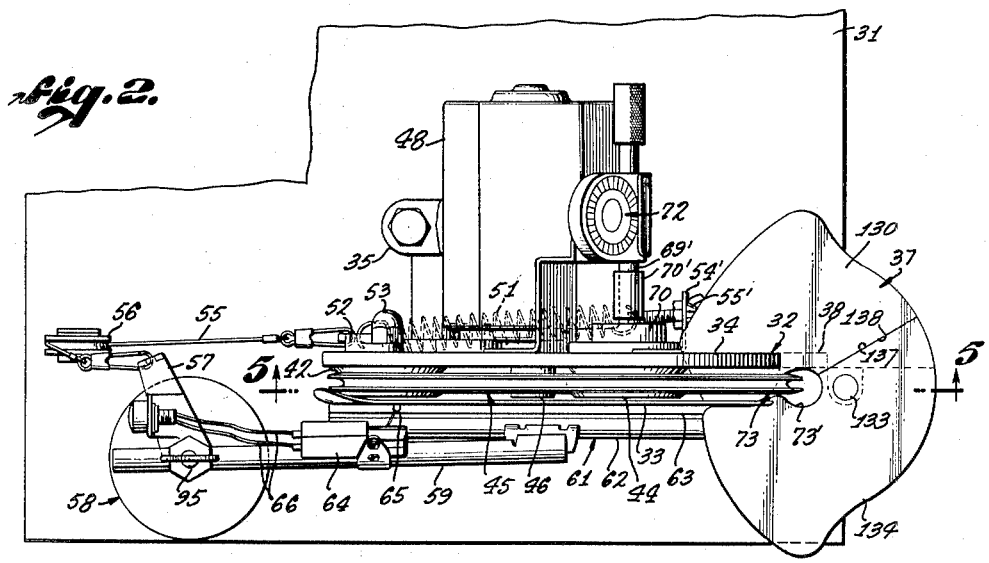
Figure 2 is a top view of my invention.
Figure 3:
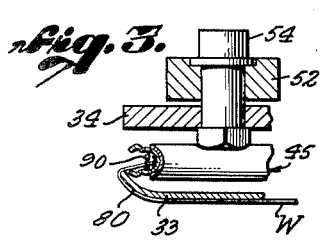
Figure 3 is a fragmentary sectional view taken on line 3—3 of Figure 1.
Figure 4:
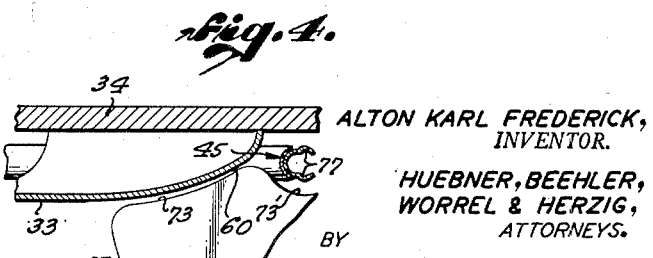
Figure 4 is a fragmentary sectional view taken on line 4—4 of Figure 1.

The movable part 134 of the platform is adapted to be raised vertically until the adjacent edges 137 and 138 at the parting line opposite the slot 73 are cleared, thereby permitting the movable part 134 to be manually turned upon the pin 133 in a counterclockwise direction, as shown in Figure 2, so as to open the slot 73 to an extent required for its insertion into the inner enlarged portion of the slot of the bobbin to permit the use of the bobbin.

The opposed edges of the slot 73 are preferably spaced apart a sufficient distance to accommodate, slidably, the largest diameter of wire intended to be wound upon the coil. The slot thereby is of small enough width to guide the wire accurately between the coil and the bobbin, so that when the platform 37 is again closed by permitting the movable part 134 to return to a flush condition with the stationary part 130, which is occasioned when a shoulder 140 under the movable part engages the upper edge 141 of the vertical sleeve 132, the wire can be wound around the coil in a highly accurate, substantially automatic manner. Lashing of the wire is avoided by the narrow portion of the slot 73.

In the formation of the instant bobbin, as shown in Figures 28 through 31, a strip of metal 150 is continuously led between friction rollers 151 and 152 and through forming rollers 153 and 154, which, as shown in Figure 29, are provided with complementary tongues and grooves circumferentially thereof, whereby the beads 77 are formed in the incipient bobbin. Other pairs of rollers 155—156, by means of interfitting male and female portions 157—158 respectively, form the central U-shaped channel and cross section in the bobbin, after which the strip 150 thus channeled and beaded, is led between additional suitably shaped forming rollers 159 and the like, which are appropriately positioned, preferably in an adjustable manner known to the art of metal-forming, to achieve an annulus in the bobbin part 78. Thereupon the strip 150 is cut, as at 160, to complete formation of said annulus 78.

The other portion 79 of the annulus may be similarly formed and, as previously stated, soldered or otherwise appropriately secured to the portion 78 in a manner shown most clearly in Figures 11 through 17.

It will be noted in connection with the above described apparatus, as also illustrated and further exemplified in the drawings, that the platform 37, adapted to hold the coil and core C, is angularly slotted in a manner to cause the coil and core to be applied thereto with the utmost facility, and thereafter to cause the coil to turn automatically upon its axis and around the bobbin 45 to insure uniform winding.

Also, the wire W, as it is fed to the core in the bobbin-pay-off portion of the cycle, as illustrated, for example, in Figures 1 and 26, may be tensioned to an utmost extent, preferably to approximately two-thirds of the tensile strength of the wire, such tension being applied by the braking action in particular of selected friction members of the type illustrated in Figures 17 through 23. The type of friction or braking member 104 and 120 are adapted by means of their body portions 108, end portions 107, or body portions 121, respectively, to provide abutment for the abutting engagement of corresponding body and end portions of other such members in a manner to permit a plurality of such members to be positioned around the bobbin to exert accumulative braking effect. For this purpose also, while such abutment need be only in one direction to accomplish the desired purpose, the members, particularly those 104, are adapted to interlock either with each other in an overlapping fashion, or with the separate guide member 106, which may be suitably notched to retain such body portion 108 or end portions 107 of an associated complementary friction member.

Such guide member 106 is likewise formed with an eyelet 123, or the like, by virtue of which the wire W is trained over the edges 103 of the bobbin, and is presented in spaced relationship from the side wall of the adjacent plate 33 so as not to rub unduly against the latter, nor the edges thereof. It is preferable that the wire engage said plate 33 only at the wiper or other friction element 63 by whose resilient and yieldable contact any abrading action is minimized. Moreover, the guide 106 is adapted to pivot upon its longitudinal axis corresponding to the circumferential periphery of the bobbin by means of its hook-formed ends 109' which have for this purpose a pintle-like association with the associated lip at 103 of the bobbin. The shape of the eyelet 123 is such as to present a relatively broad arc of curvature to the wire and to permit the same to pass with a minimum of friction.

The form of the device at 120 is such also as to provide an eyelet 123 for the wire W, in such a manner as to carry the same beyond the corresponding side edge of the bobbin 45 and its associated plate 33 to minimize frictional engagement of the wire therewith. The form of the frictional member 120 is such that the same can provide a combined guide and friction shoe, and any number of such members 120 may be placed in abutting relationship around the edge of the bobbin so as to increase to any desired extent the amount of tension applied to the wire as the same is wound upon the coil C.

The wiper blade 63 engages against the side of the plate 33 with any desired degree of tension depending upon the extent to which the spring mechanism at 58 is wound or tightened. Thereby adjustment is possible for wires of small size as well as those of heavier type, although it has been found preferable to utilize a friction plate of a type shown in my co-pending application Serial Number 316,330, filed October 22, 1952, of which this application is a continuation in part, when the wire size is heavier than No. 30 wire.

As may be seen most clearly from Figures 5 through 9, the bobbin 45 is operatively positioned around pulley wheels driven by a belt 47. Such belt is preferably of circular cross section, although a V-type belt is also usable to advantage.

The bobbin 45 is preferably so constructed and proportioned relative to the pulley wheels 40, 42 and 44 that the inner ring 79 rides not only within the groove of the pulley wheels but also is frictionally and resiliently supported upon the belt 47, thereby causing said belt to serve the dual purpose of driving the wheels and cushioning, supporting and moving the bobbin. A new and improved smooth and flexible driving action for the bobbin is thereby achieved.

By the above construction, it has been found possible to successfully make and drive a bobbin of approximately .125 inches in cross section, and to wind successfully and easily copper wire of a size equal to No. 45 on the Brown & Sharpe scale. It is also easily possible to utilize bobbins of a diameter of 36 inches and more by using the instant construction.

The bobbins, it has been found, can be formed of plastic, steel, or other suitable stock, and rolled and otherwise shaped, as aforesaid, to form the two U-shaped channels defining the inner wall member 75, and the outer and side wall member 76 which collectively form the bobbin when united together as above mentioned by soldering or the like. Formation of the bobbin in this fashion, from sheet stock, renders commercially feasible, upon an economic and operationally satisfactory scale, the provision of bobbins of any suitable size or any desired use.

The ends at 81 and 82 of the respective inner and outer strips, when formed and united as shown in Figures 11 through 17, for example, provide a tapered edge at said points of junction of the inner and outer walls over which the wire is drawn without hitching. Thus, as shown in Figure 12, for example, the wire would be drawn in a clockwise direction so that even though incidental or accidental engagement of the wire with the points 81 or 82 should take place, notwithstanding the provision of the guide of the form of Figures 20, 21 and 22, for example, the slanted nature of such ends would avoid cutting, snagging and severing, or otherwise damaging the wire W.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent structures and devices.

I claim:

An apparatus for winding toroidal coils comprising: apparatus support means, including plate means mounted on the support means, friction pressure means disposed adjacent one side of said plate means and including means urging said pressure means against said plate, annular bobbin means mounted on said support and including locking means releasably holding said bobbin means in annular condition, drive means for said bobbin means, sliding tension means frictionally engaging said bobbin for paying off a wire wound therein with selected tension, generally annular guide means associated with said sliding tension means defining a guide at one side of the bobbin for training said wire out of said bobbin and directly into said friction pressure means, and platform means on said support means including a slot for accommodating a partly wound coil and the body of said bobbin means, said bobbin means comprising a pair of generally annular members of substantially U-shaped cross-section, means for holding said members in circumferential nested relationship throughout the major portion of their circumferences, second means for retaining said members in a releasable closed annular condition throughout the rest of their circumference for defining a circumferential bobbin channel therearound, said second means comprising opposite ends of each of said members said ends being angularly complementarily shaped and respectively abuttable in said releasable closed condition of the bobbin means, said ends of the respective members in said closed position being offset circumferentially of the bobbin defining one free end on each of said members adapted to overlap the opposite end of the other member and to extend beyond the corresponding end of said other member, detent means comprising a finger extending radially from one of said pair of generally annular members and a matching opening formed in the other member, releasably inter-engageable with said finger for retaining the free ends of the respective members in releasable overlapping engagement with the opposite ends of the respective members in mutual abutment, the ends of said members in said overlapping and abutting relationship defining an angle relative to a radius of said bobbin for camming a wire over said ends.

References Cited in the file of this patent

UNITED STATES PATENTS

| | | |
|---|---|---|
| 682,142 | Gill | Sept. 3, 1901 |
| 1,400,116 | Wheildon | Dec. 13, 1921 |
| 1,879,882 | Pullets | Sept. 27, 1932 |
| 2,171,119 | Belits | Aug. 29, 1939 |
| 2,185,883 | Berger | Jan. 2, 1940 |
| 2,672,297 | Harder | Mar. 16, 1952 |
| 2,704,637 | Redlich | Mar. 22, 1955 |

FOREIGN PATENTS

| | | |
|---|---|---|
| 644,466 | Germany | May 3, 1937 |
| 624,213 | Great Britain | May 31, 1949 |